US009137708B2

(12) United States Patent
Cao et al.

(10) Patent No.: US 9,137,708 B2
(45) Date of Patent: Sep. 15, 2015

(54) MECHANISM FOR APPLICATION MOBILITY IN A CELL SITE-BASED CONTENT DISTRIBUTION NETWORK

(75) Inventors: Yang Cao, Westford, MA (US); Talbot Hack, Ann Arbor, MI (US); Michael Nicolazzo, Philadelphia, PA (US); Moshe Suberri, Voorhees, NJ (US); William M. Turner, Higganum, CT (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 366 days.

(21) Appl. No.: 12/473,769

(22) Filed: May 28, 2009

(65) Prior Publication Data

US 2010/0306304 A1   Dec. 2, 2010

(51) Int. Cl.
  *G06F 15/16* (2006.01)
  *H04W 36/00* (2009.01)
  *H04L 29/08* (2006.01)
  *H04L 29/06* (2006.01)
  *H04W 80/12* (2009.01)

(52) U.S. Cl.
  CPC ......... *H04W 36/0011* (2013.01); *H04L 67/148* (2013.01); *H04W 36/0022* (2013.01); *H04W 36/0033* (2013.01); *H04L 29/06517* (2013.01); *H04L 65/608* (2013.01); *H04W 80/12* (2013.01)

(58) Field of Classification Search
  CPC ............ H04L 67/148; H04L 29/06517; H04L 65/608; H04W 36/0033; H04W 36/0011; H04W 36/0022
  See application file for complete search history.

(56) References Cited

U.S. PATENT DOCUMENTS

| 6,771,644 B1* | 8/2004 | Brassil et al. ................. 370/432 |
| 2003/0145038 A1* | 7/2003 | Bin Tariq et al. ............. 709/202 |
| 2003/0204599 A1 | 10/2003 | Trossen et al. |
| 2006/0171402 A1* | 8/2006 | Moore et al. .................. 370/401 |
| 2008/0153460 A1* | 6/2008 | Chan et al. ................. 455/412.1 |
| 2008/0240439 A1 | 10/2008 | Mukherjee et al. |

FOREIGN PATENT DOCUMENTS

EP     2040436 A1   3/2009

OTHER PUBLICATIONS

International Search Report for Application No. PCT/US2010/036713, dated Aug. 16, 2010.
International Preliminary Report on Patentability for Application No. PCT/US2010/036713, dated Nov. 29, 2011.
Chinese Office Action for Application No. 201080031762.8, 16 pages, dated Mar. 5, 2014.

* cited by examiner

*Primary Examiner* — Patrice Winder
*Assistant Examiner* — Nam Tran
(74) *Attorney, Agent, or Firm* — Finnegan, Henderson, Farabow, Garrett & Dunner LLP

(57) ABSTRACT

A method in an electronic device provides a mechanism for maintaining application mobility in a communication network, such as a content distribution network. In one exemplary embodiment, a user device transitions from a source content server in a first access network of the communication network to a destination content server in a second access network of the communication network. The source content server hands off responsibility for serving the content to the destination content server. In some embodiments, a tunnel is created between the source content server and the destination content server.

11 Claims, 11 Drawing Sheets

MECHANISM FOR APPLICATION MOBILITY IN A CELL SITE-BASED CONTENT DISTRIBUTION NETWORK

BACKGROUND

A communication network typically includes a core network and at least one access network. The core network is the central part of the communication network and serves as the backbone of the communication network. The core network typically includes high capacity switches and transmission equipment. Each access network serves as a point of contact with the communication network for users. Access networks connect subscribers with their service providers. An access network serves as a point of contact with the communication network for users. A communication network may have multiple access networks, serving different sets of users, in communication with a single core network.

A communication network may deliver content to a user. Typically, a user device in an access network will create a request for a certain piece of content, and forward that request through the access network to the core network. A core services platform may be located within the core network. The core services platform is a device that performs a variety of services. For example, the core services platform may identify a location where the requested content is stored. Typically, this location is a content storage repository. The content storage repository may be located in the same access network as the user, in a different access network, or in the core network. The core services platform then may coordinate the retrieval of the requested content from the content storage repository, and may coordinate the delivery of the requested content back to the user device.

In a mobile communication network, end-users may be capable of moving to different access networks. Examples of mobile communication networks include, but are not limited to, cell phone networks, WiFi networks, WiMax networks, and mobile broadband networks. Content may be sourced by the core network, which may coordinate the delivery of content or store the content, or both. The content may be provided to a user device in the mobile communication network, and it may not be necessary for some of the applications and devices supporting the delivered content to be aware of the mobility of the user.

For example, a video may be stored on a file server in a core network and streamed to a user via an application server in the core network. The user, initially in a first access network, communicates with network devices in the first access network. The network devices in the first access network request the video from the core network. The core network and devices in the first access network may establish a series of protocols that allow the video to be streamed to the user via the application server in the core network. If the user moves to a second access network, the user communicates with different devices in the second access network. These devices may similarly request the video from the core network. Because the core network is involved in coordinating the serving of the video to the user, it may be possible for the core network to continue streaming the video to the user in the second access network without significant degradation in the quality of the video caused by the user changing access networks. Further, the core network may not need to identify when the user moves to a new access network, because the devices in the new access network will request the video from the core network.

However, the operator of a mobile network may desire to move certain content to a local content server in an access network, or move content delivery coordination into an access network. By moving content and coordination out of the core network, core network resources may be freed for other purposes, improving overall bandwidth, access, and reliability in the communication network. However, when content or services are moved out of the core network and into the access network, it may be useful for devices in the network to be made aware of the mobility of the user so that the devices can coordinate the provision of content and services.

SUMMARY

A mechanism supports application mobility in a content distribution network, such as a cell site-based content distribution network. The mechanism may provide protocols for the de-centralization of services from the core network into an access network. Methods are provided methods to allow applications, devices, and services to become aware of the mobility of a user in the communication network, such as when a user moves from one access network to another.

According to exemplary embodiments of the methods described herein, content, services, or the management and coordination of content or services may be moved from centralized sources in the core network to local sources in the access network. In this case, the local sources may acquire information related to the mobility of a user. For example, if a streaming video is provided to a user using a cell phone, the cell phone may initially interact with a first access network. In the first access network, a local server may store the video, or may act as an application server to provide streaming capabilities, or both. The local content server in the first access network sources the content to the user. If the user subsequently moves from the first access network to a second access network, the two access networks may need to coordinate in order to provide the video stream without significantly degrading the quality of the stream.

Devices in the first access network may acquire information related to the termination of protocols associated with services, applications, and devices that that the user was interacting with in the first access network. Further, the first access network may acquire information related to the user's new location, so that devices in the first access network may coordinate the transfer of management of services, applications, and other information that the user had been utilizing in the first access network into the second access network. Similarly, the second access network may acquire information from the first access network related to services, applications, information and devices that the user may be interacting with, or may handle the transfer of services, applications and other information into the second access network.

According to one exemplary embodiment, a method is performed in an electronic device. A source content server serves content to a user device. When the electronic device identifies that the user device may be transitioning from a source content server to a destination content server, the source content server prepares to hand off responsibility for serving the content to the destination content server. In one exemplary embodiment, the source content server may be provided in a first access network, and the destination content server may be provided in a second, different, access network. The electronic device may detect when the user device is transitioning from the source content server to the destination content server by detecting that the user device is changing from the first access network to the second access network.

In some embodiments, the sourced content may be content that is capable of being streamed (such as a streaming video, audio, animation, or multimedia). In this case, a data stream associated with the streaming content may be duplicated on the destination content server. The duplicate stream may be synchronized with the original data stream on the source content server.

In some embodiments, a tunnel is created between the source content server and the destination content server. If the served content is streaming content, the stream may be duplicated over the tunnel.

In some embodiments, the source content server may source content using one or more proxies. The proxies may have a context, and the context may be moved from the source content server to the destination content server.

In some embodiments, one or more applications related to the sourced content may be invoked on the destination content server.

Further, an electronic device is provided for managing application mobility in a communication network. The electronic device may include storage for storing instructions for managing the content and a processor for executing instructions.

According to other embodiments, an electronic device readable storage medium storing executable instructions for managing application mobility in an access network is also provided.

DETAILED DESCRIPTION

In exemplary embodiments described herein, an electronic device in a communication network coordinates application mobility. The communication network may include a core network and at least one access network. The access network may be configured to intercept data requests from a user device, and serve the requested data locally. For example, the access network may serve requested data using local file servers or local application servers, or both. This allows intermediate service platforms in the local access network to serve data with minimal involvement from the core network, conserving network resources.

Figure 1:
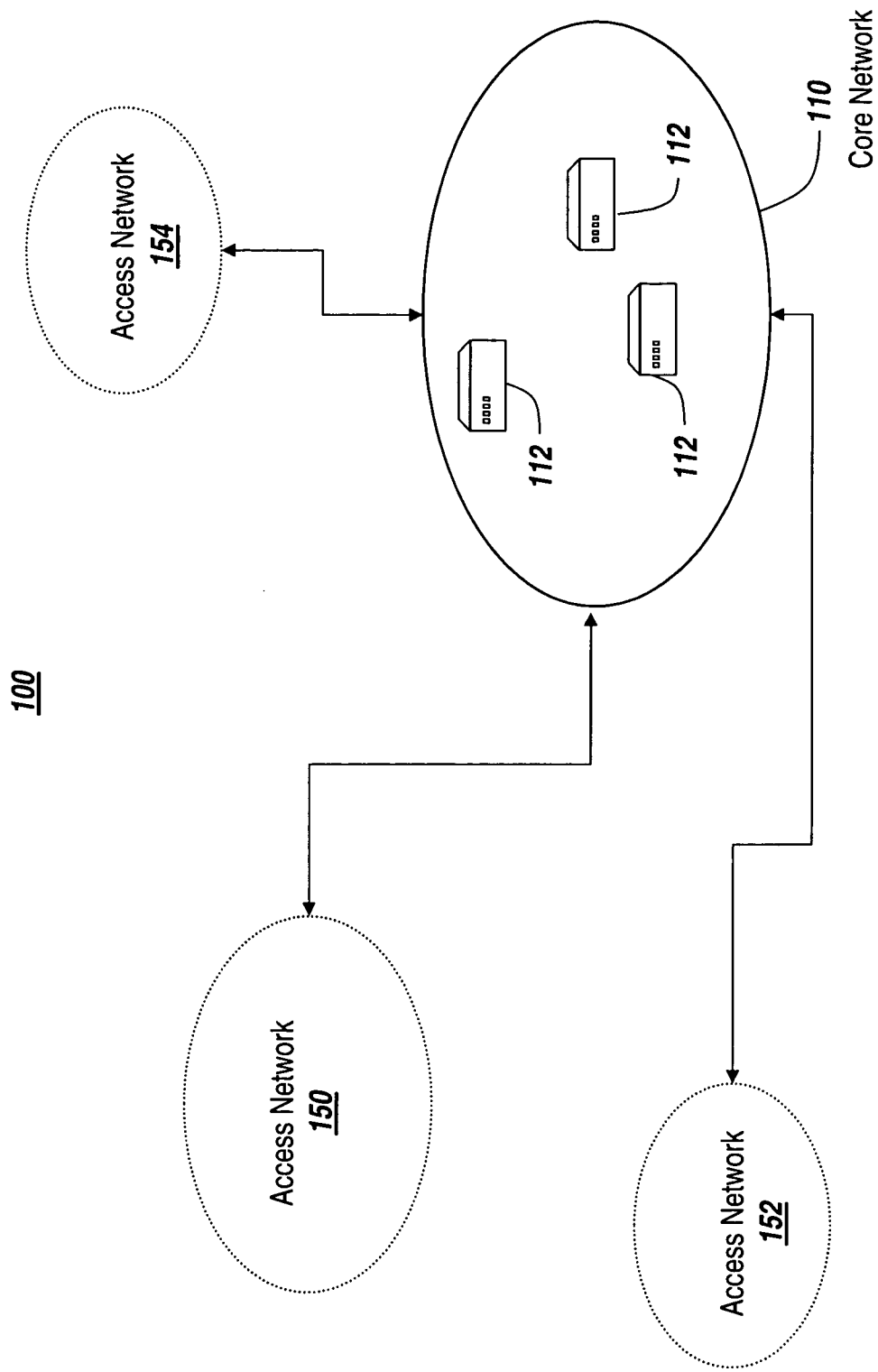
FIG. 1 depicts a communication network suitable for exemplary embodiments.

FIG. 1 depicts a communication network 100 suitable for exemplary embodiments. According to one embodiment, the communication network 100 may be a wireless network and may include a core network 110 and access networks 150, 152 and 154. Those skilled in the art will appreciate that the communication network 100 may include wired networks as well. Each access network 150, 152 and 154 serves as a point of contact with the communication network for users, and connects subscribers with their service providers. According to other embodiments, communication network 100 may include more or fewer access networks. One skilled in the art will recognize that the functionality described herein example is equally applicable in different types of communication networks, such as a network utilizing a WiFi framework, a UTRAN or UMTS framework, a CDMA framework, a WiMax framework, or a UMB framework, among others.

Communication network 100 may have multiple access networks, serving different sets of users, in communication with a single core network. Examples of access networks include the UMTS Terrestrial Radio Access Network (UTRAN), the GSM Radio Access Network (GRAN), and the GSM Edge Radio Access Network (GERAN).

Communication network 100 may be a content delivery network. A content delivery network may provide content to a point in the network, such as a user device. Examples of content include, but are not limited to, streaming video or audio, non-streaming video or audio, images, text, files, and other forms of data.

Core services platforms 112 located in core network 110 may provide services within the core network. The services may include (but are not limited to) fetching data from a storage repository, running applications for use in the network, or routing data throughout communications network 100 or into the access networks, for example access network 150. Core services platforms 112 may take a number of forms, depending on the services to be provided. For example, core services platforms 112 may be servers within core network 110, for example file servers, print servers, mail servers, or application servers. Alternatively, a core services platform 112 may be a switch or a router, a network bridge, a network hub, or a repeater.

Figure 2:
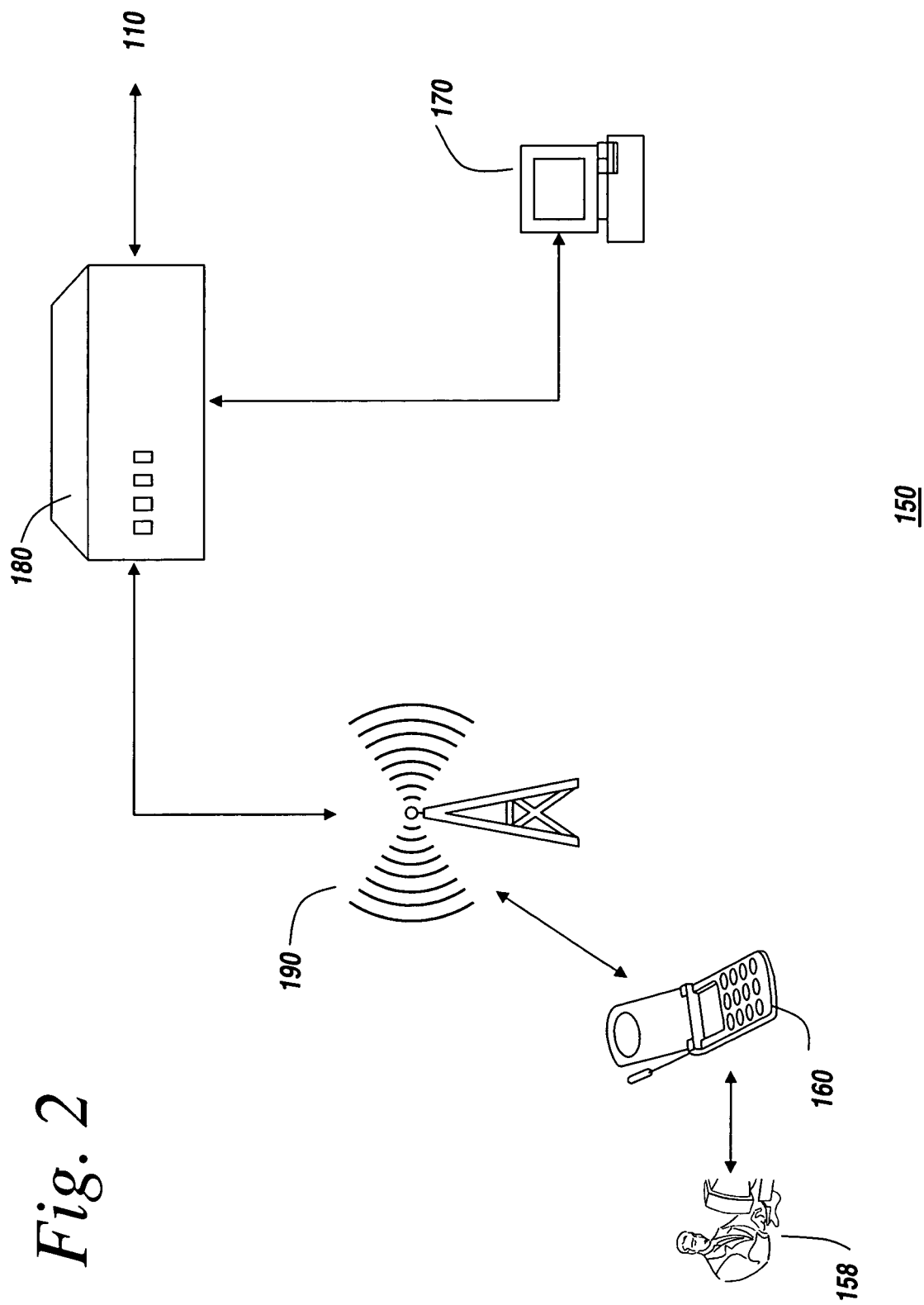
FIG. 2 depicts access network 150 of FIG. 1 in more detail.

FIG. 2 depicts exemplary access network 150 in more detail. In access network 150, an electronic device 170 sources content to a user device 160. In one embodiment, electronic device 170 is a local content server. Alternatively, electronic device 170 may be, for example: another type of server (such as a file server or a mail server), a router, a computer system (such as a personal computer), a cellular phone, a personal digital assistant, a Global Positioning System device, or a custom-designed device. Alternatively, content may be sourced by another device in the access network, such as base station 190, intermediate service platform 180, or user device 160, each of which may serve as a local content server.

Alternatively, electronic device 170 serving content may be located in the core network 110, or in another access network, such as access network 152 or access network 154. In FIG. 2, electronic device 170 is shown in communication with intermediate service platform 180, although this need not be the case.

A user 158 using a user device 160 may interact with access network 150 via a communications device such as a modem, fiber optic connection, or a transmitter and receiver for radio communication. User device 160 may be, for example, but is not limited to, a computing device, a personal digital assistant, a cellular phone, or a Global Positioning System device. User device 160 may also be an electronic device, such as electronic device 170 depicted in FIG. 3. User device 160 may send and receive data through a base station 190 located in access network 150. Base station 190 may be, for example, a gateway, a cell tower, a Node B, or an Enhanced Node B.

The base station 190 may interact with one or more intermediate service platforms 180 located in access network 150 or may interact directly with core network 110. Intermediate service platforms 180 may perform tasks such as resource management (directing control of the network in a manner that allows the efficient use of network resources), filtering (inspecting incoming and outgoing data in order to remove extraneous, harmful, or harassing data), and routing (directing network traffic towards its appropriate destination). Examples of intermediate service platforms 180 include, but are not limited to, Radio Network Controllers, bridges, routers, and servers such as mail servers, application servers, file servers, print servers, and Virtual Private Network (VPN) servers.

When user 158 requests content, the core network 110 may locate the requested content in a storage repository, which in one embodiment is electronic device 170. For simplicity, FIG. 2 depicts electronic device 170 in access network 150. However, the present invention is not so limited. For example, electronic device 170 may be in the user device's access network 150, or core network 110, or in a different access network 152. Once electronic device 170 is located, the data may be sent back to the user device 160, potentially after being routed through the core network 110.

Once data has been retrieved from electronic device 170, it may be routed through access network 150 via intermediate service platform 180 or base station 190, or both. Intermediate service platform 180, base station 190, or electronic device 170 may maintain a cache for temporarily storing recently used data.

Figure 3:
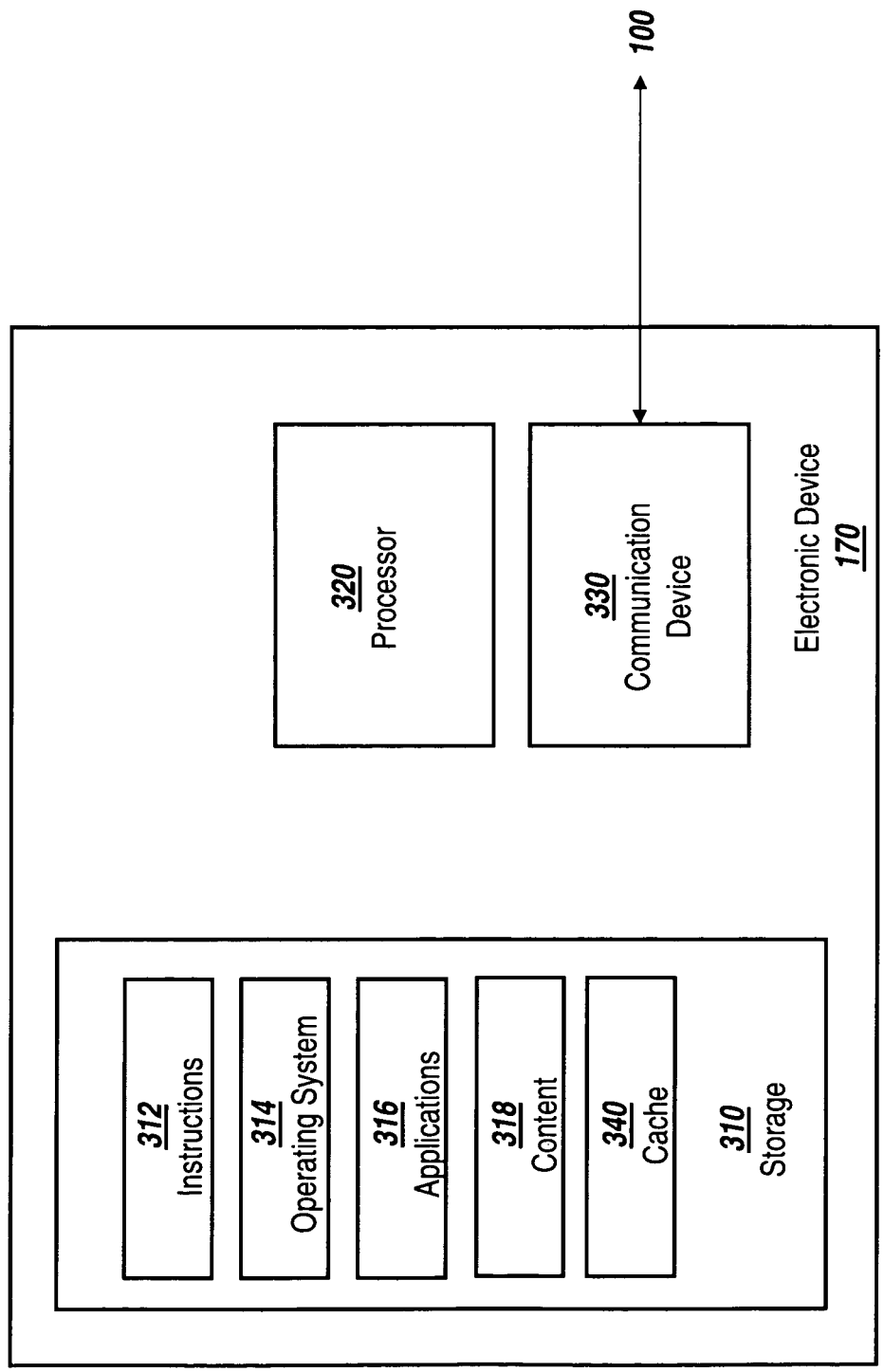
FIG. 3 depicts electronic device 170 of FIG. 2 in more detail.

FIG. 3 depicts electronic device 170 in more detail. Electronic device 170 may contain a storage 310 for storing instructions 312 to be executed by a processor 320, such as a microprocessor, ASIC, FPGA, or a controller. Instructions 312 may be stored on one or more electronic device readable media. Examples of electronic device-readable storage media include, but are not limited to, RAM, ROM, magnetic storage media, or optical storage media. Instructions 312 may cause processor 320 to perform a series of steps described in detail below. Instructions 312 may be in any form that describes how to perform these steps. For example, the instructions may be uncompiled code in any suitable programming language, compiled code, assembly language instructions, or any other type of instructions.

Storage 310 may also store an operating system 314 for operating electronic device 170. Storage 310 may store additional applications 316 for providing additional functionality, as well as data 318 for use by the electronic device 170 or another device. Data 318 may include content for delivery in a content distribution network. Storage 310 may also store a cache 340.

Electronic device 170 may have a communication device 330 for communicating with communication network 100. Communication device 330 may be, for example, a modem, an Ethernet connection, a fiber optic connection, a radio antenna, or any suitable means for communicating with a network.

Figure 4:
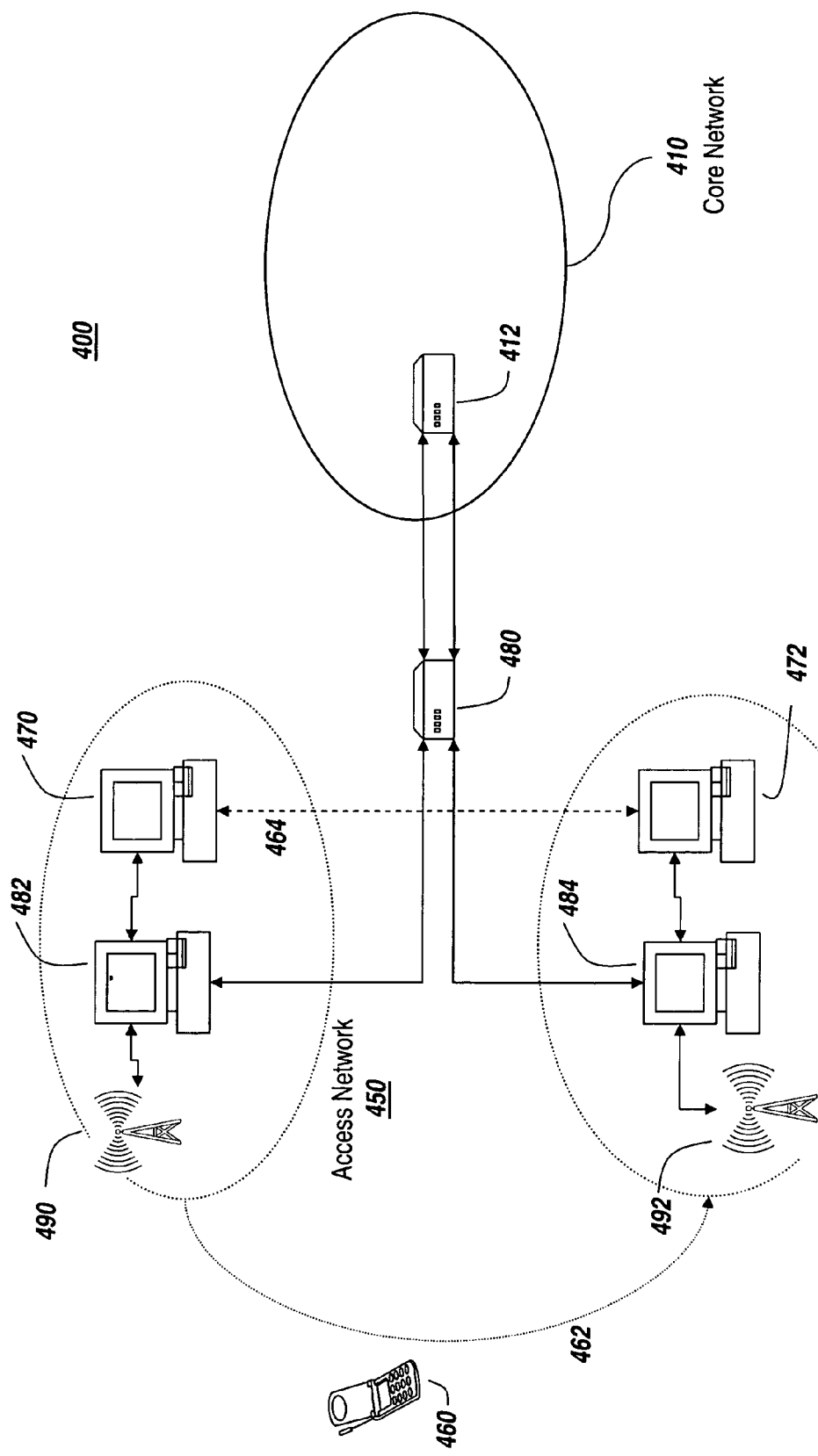
FIG. 4 depicts an exemplary transition when a user moves between access networks.

In a mobile network, a user may be free to move. A user's movement may result in the user changing from a first access network to a second access network. In FIG. 4, network 400 includes core network 410 and two access networks 450 and 452. FIG. 4 depicts user device 460 moving between access networks 450 and 452. User device 460 initially interacts with access network 450. An exemplary procedure followed in the network when a user requests data or moves between access networks is described below with reference to FIG. 6.

Electronic devices 470 and 472 may provide local services for their respective access networks, such as file serving, application serving, coordinating the provision of content or services, or coordinating streaming video or audio. Base stations 490 and 492 provide a point of contact between access networks 450 and 452, respectively, and user devices, such as user device 460.

In one embodiment, an intermediate service platform 480, for example a router or a Radio Network Controller, sits between each of access networks 450 and 452 and the core network 410. Alternatively, intermediate service platform 480 may be located in an access network, such as access network 450. Other intermediate service platforms 482 and 484, for example routers, serve as edge gateways for the access networks 450 and 452, respectively. Intermediate service platforms 482 and 484 may communicate with base stations 490 and 492, respectively.

Intermediate service platforms 482 and 484 may each communicate with a core services platform 412 located in the core network through intermediate service platform 480. Core services platform 412 may be, for example, an SGSN, a GGSN or a Central Content Distribution Network Server.

The user device 460 may send a request for data content to the network, and in doing so, may cause the base station 490 to start signaling the intermediate service platform 480. The intermediate service platform 482 may monitor this signaling to intercept a request for content. If the intermediate service platform 482 receives a request for content, the intermediate service platform 482 may forward the request to an electronic device 470 acting as a local content server in the access network 450. The electronic device 470 may query the cache 340 to see whether the requested content is present in the cache 340 or may locate the requested content 318 in the storage 310. If the requested content is present, the electronic device 470 may provide the requested content to intermediate service platform 482. Intermediate service platform 482 may then forward the requested content to the user device 460 through the base station 490. In this way, the requested content may be provided to the user without involving the core network 410.

Alternatively, if the requested content is not found on electronic device 470, electronic device 470 may request the content from core network 410. Electronic device 470 may forward the request for data through intermediate service platform 482. Once the electronic device 470 acquires the requested content from the core network 410, the electronic device 470 may store the requested content in the storage 310 so that future requests for the content may be served locally through the access network 450 rather than through the core network 410. Optionally, the requested content may be cached in the cache 340 so that future requests may be served more quickly.

If the user moves between the access networks (indicated by a transition 462 in FIG. 4), such that user device 460 now interacts with access network 452 instead of access network 450, a request for data may be forwarded to the new electronic device 472 locally serving content in the access network 452. If the content is not found in the storage 310 of electronic device 472, the electronic device 472 may request the content from the core network 410, as described above. Alternatively, the electronic device 472 may request the data from the electronic device 470, which acts as the local content server in the user device 460's original access network 450. By communicating with the electronic device 470, the electronic device 472 may be able to acquire the requested data without involving the core network 410.

In some cases, additional steps may be taken to allow responsibility for content provided on electronic device 470 to be handed off to electronic device 472. For example, electronic device 470 may have invoked applications which are used to provide the content, or electronic device 470 may be providing streaming content, such as streaming video or audio, to the user device 460. In the latter case, a duplicate stream may created on, or moved to, electronic device 472, and the duplicate stream may be synchronized with the original stream in order for the transition 462 to appear substantially seamless to the user.

The transfer of responsibility may be accomplished by providing a connection 464 between electronic device 470 and electronic device 472. Connection 464 may directly connect electronic device 470 and electronic device 472, or may indirectly connect electronic device 470 and electronic device 472 through other devices. In some embodiments, the connection 464 is a tunnel. A tunnel creates a path through a network, such as network 400. A tunnel can be used, for example, to provide a connection between devices (such as electronic devices 470 and 472) in two different access networks, such as access networks 450 and 452. A tunnel may also be used to carry content over an otherwise incompatible network, or provide a secure path through an untrusted network. In some examples, a tunnel may encapsulate a first protocol, such as a network protocol, within a second protocol. Examples of tunnels include, but are not limited to, IP tunnels, L2 TP tunnels, MPLS tunnels, SSH tunnels, PPTP tunnels, HTTP tunnels, and Anything-in-Anything tunnels. Connection 464 is not limited to tunnels, however. Connection 464 may represent a physical connection, such as (but not limited to) a copper wire or fiber optic cable, a wireless connection, such as (but not limited to) a radio broadcast signal or an optical signal, or a communication path through the network 400, such as a virtual or logical data connection between ports on the devices.

The transfer of responsibility for content between two local content servers may be accomplished when the user transitions 462 between communicating with a source content server to communicating with a destination content server. This transition 462 can be detected in a number of ways. For example, the user device 460 may detect that it is moving out of range of the source content server and into the ranger of the destination content server, for example by comparing the relative signal strengths between the user device 460 and the two content servers.

Figure 5:
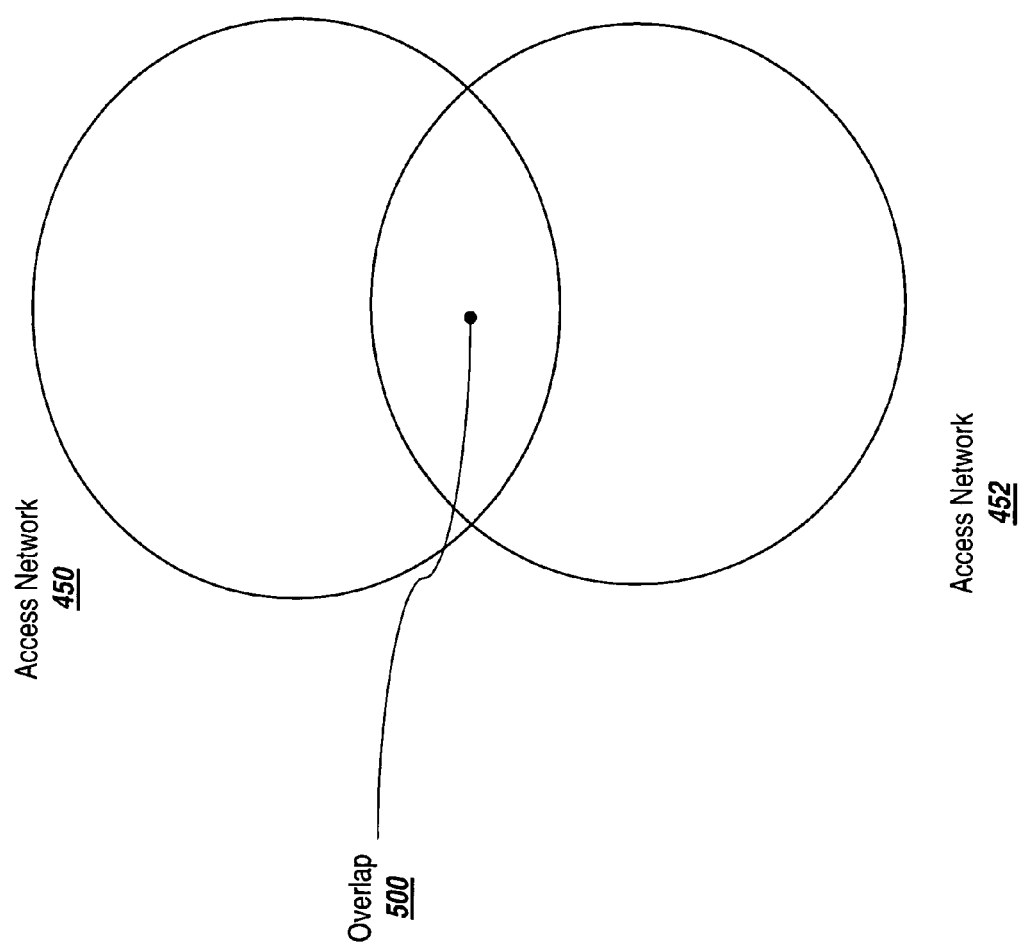
FIG. 5 depicts the overlap between the geographical areas covered by two access networks.

In the case where the source content server is provided in a first access network, and the destination content server is provided in a second access network, the transition 462 may be detected when the user device 460 begins interacting with the second access network, or with the first and second access networks at the same time. In some mobile communication networks, an overlap may be provided between the areas covered by different access networks. For example, FIG. 5 depicts the overlap 500 between the geographical areas covered by two access networks 450 and 452. In the area covered by access network 450, indicated by the vertical cross-hatching, a user device 460 interacts with the devices in access network 450.

The area covered by access network 450 may indicate, for example, the amount of geographical space that can be reached by base station 490, which may represent the broadcast range of base station 490, or the range at which base station 490 can receive transmissions from user device 460, or both. Alternatively, the geographical limitations of access network 450 may be arbitrarily established by the operator of the communication network 400 or by the operator of the access network 450. Similarly, the area covered by access network 452 represents the geographical area that represents the access network 452.

In some cases, the areas covered by the access networks 450 and 452 may overlap, as indicated by the horizontally-and-vertically cross-hatched overlap 500. When a user device 460 is physically present in overlap 500, user device 460 may be communicating with devices present in both access networks 450 and 452. If a user moves from the non-overlapping area of access network 450 into overlap 500, then it may be determined that the user is transitioning from access network 450 to access network 452. While the user is in overlap 500, the user is still able to communicate with devices in access network 450. Thus, the devices in access network 450 can prepare to hand off responsibility for providing content to user device 460 to access network 452. When the user transitions out of access network 450 by moving out of overlap 500 and into the area covered by access network 452 (but not access network 450), the handover may be completed substantially seamlessly and the user device 460 may continue to receive content.

One having ordinary skill in the art will understand that other configurations for the access networks are possible. For example, the access networks 450 and 452 may not overlap. Additionally, in a communication network including more than two access networks, it is possible that three or more access networks will overlap. The overlap areas may represent the geographical location where three or more access networks all overlap. Alternatively, there may be multiple overlap areas within each access network. One example of multiple overlap areas is when two different access networks each overlap a third access network at different locations. Another example is when a first access network overlaps a second access network in two different locations. This might be the case, for example, when an obstruction alters the shape of an access network.

Further, the areas indicated by access networks 450 and 452, and by overlap area 500, need not correspond to a geographical area or a physical area. The areas covered by an access network may be, for example, a collection of IP addresses or some other logical or virtual partition.

In some examples, when user device 460 is present in the area covered by the access network 450 but is not present in the overlap area 500 (indicated by the vertical and horizontal cross-hatching), the user device 460 does not interact with the devices in access network 452, or is not able to interact with the devices in access network 452 as effectively as the devices in access network 450. Alternatively, it may be the case that the user device 460 is capable of interacting with the devices in access network 452 when the user device is present in the non-overlapping area of access network 450, but it has been decided that the user device 460 should not interact with the devices in access network 452. In another example, user device 460 does interact with devices in both access networks when user device 460 is present in the non-overlapping area of access network 450, but access network 450 is designated as the user device 460's "home" access network.

In determining whether a user device 460 is transitioning 462 from one access network to another, a device in the network, may identify that the user device 460 is moving to, towards, into, or away from an access network. Examples of devices which may detect the transition 462 of user device 460 from one access network to another may include, but are not limited to, user device 460, electronic device 470, base station 490, intermediate service platform 482, intermediate service platform 480, core services platform 412, base station 492, intermediate service platform 484, or electronic device 472. Alternatively, the transition 462 may be detected by any number of devices in the network, either working alone or in cooperation.

The devices may detect the transition 462 by determining when a user leaves a non-overlapping area of an access network and enters an area overlapping two different access networks. For example, if a user is detected at a first time instance in access network 450 and at a second time instance in overlap area 500 between access networks 450 and 452, then it may be the case that the user is transitioning from access network 450 into access network 452. Those having ordinary skill in the art will understand that there are other methods of identifying a transition. For example, a base station in an access network may measure the strength of a signal coming from a user device 460. A strengthening signal over time may indicate that the user device 460 is approaching the base station (and the access network that the base station is located in), while a weakening signal over time may indicate that the user is moving away from the base station (and the access network the base station is located in). Alternatively, a global positioning system may be employed to determine where a user device 460 is and in which direction the user device 460 is moving.

A user device 460 may identify the transition 462, for example, by detecting to which base station the user device 460 has a preferred connection, for instance by comparing the signal strengths from each base station. Alternatively, a device or devices in the network 400 may decide to reassign the user device 460 from a first access network to a different access network, for example to keep an even distribution of users or bandwidth among nearby access networks.

Figure 6:
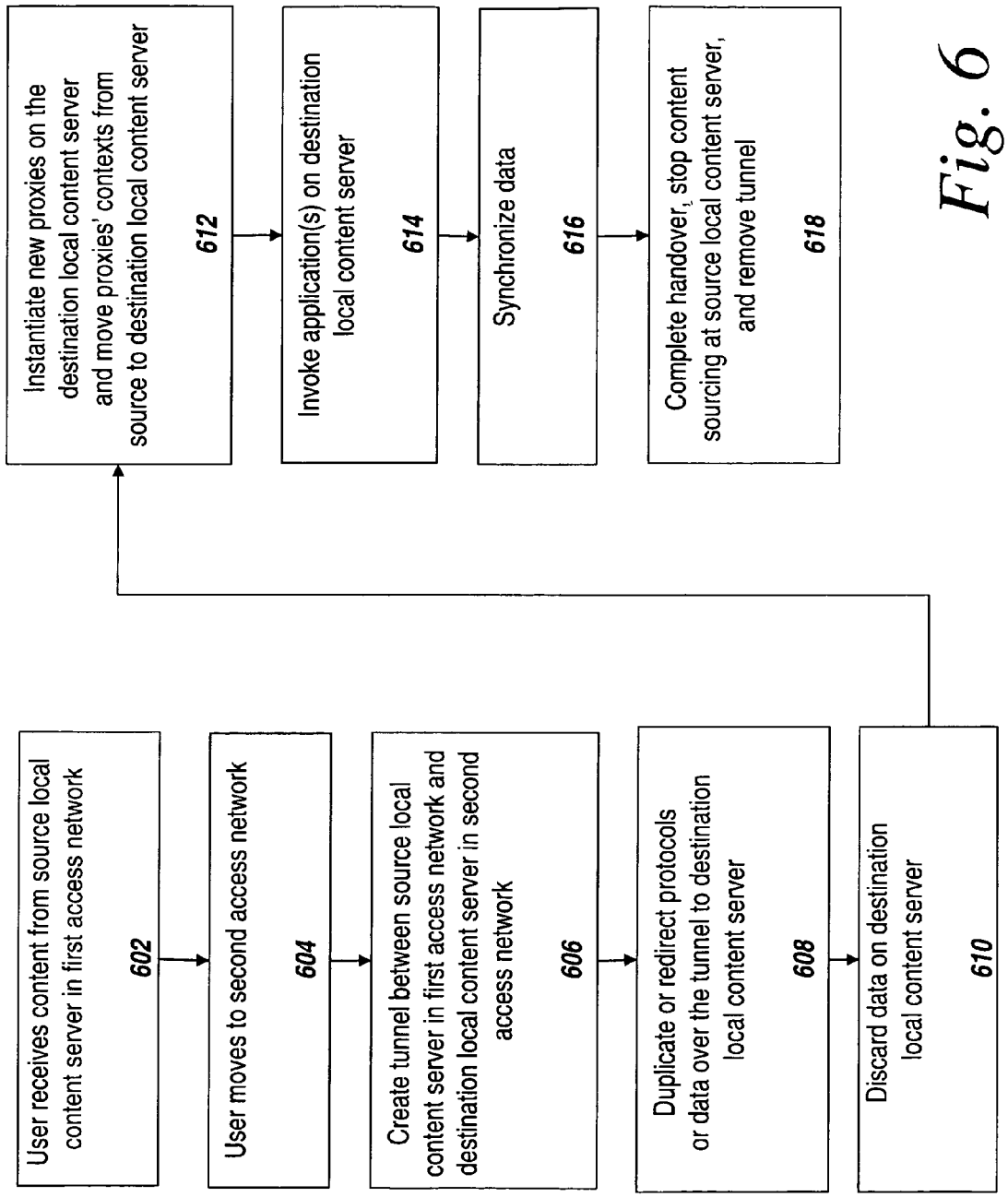
FIG. 6 depicts a flow chart of steps that may be performed in order to manage application mobility in a content distribution network.

FIG. 6 depicts a flow chart of exemplary steps that may be performed in order to manage application mobility in a content distribution network. At step 602, a user located in first access network 450 interacts with a source local content server, such as electronic device 470, in the first access network 450. User device 460 may or may not interact directly with electronic device 470. For example, user device 460 may interact with electronic device 470 through base station 490, intermediate service platform 482, or other devices in the network 400. The user may receive content from electronic device 470, for example in response to a request for content from user device 460, or in response to an instruction to provide content to user device 460 from another device in the network 400. Electronic device 470 may provide the requested content to user device 460, either directly or through other devices in the network 400.

Serving content from electronic device 470 may involve the use of one or more proxies on the source local content server. A proxy may act as a go-between between a requester and a requestee. The requester, in one example, may be user device 460, and the requestee may be an application that is capable of providing requested content.

For example, if electronic device 470 provides streaming content, electronic device 470 may provide applications that provide the data stream, for example a Real-time Transport Protocol (RTP) application and a Real Time Streaming Protocol (RTSP) application. RTP defines a standardized packet format for delivering content over the Internet, for example audio and video content. RTSP provides mechanisms for controlling a data stream, for example providing PLAY and PAUSE commands. Together with RTSP, RTP can be used to stream audio and video.

User device 460 may interact with the applications through a proxy. The user device 460 may establish a connection to each of the RTP and RTSP proxies, and the RTP and RTSP proxies may act as a go-between between the user device 460 and the protocols running on the local content server, represented by electronic device 470. Commands and content may pass through the proxy, for example from the application to the proxy, and then from the proxy to the user device, or vice versa. A proxy may isolate the application from the end user, filter packets (for example, filtering packets by IP address and port number), and maintain and encapsulate the context of the session. A proxy session's "context," provides information about the proxy session. A proxy session context may include information like a session identifier to indicate a particular instantiation of a proxy session, a TCP context, a current state, and IP addresses and port numbers of devices associated with the proxy.

The RTP and RTSP proxies may be provided on electronic device 470, or may be provided on (or may be) other devices in the network 400.

User device 460 may communicate with multiple proxies using the same protocols, or different protocols. In the case of an RTP and RTSP proxy, user device 460 may communicate with the RTP proxy over a User Datagram Protocol (UDP) connection. User device 460 may communicate with the RTSP control application through the RTSP proxy using a Transmission Control Protocol (TCP) connection.

At step 604, the user transitions 462 (or beings to transition) to a second access network, such as access network 452. Methods for detecting and identifying such a transition 462 are described above in relation to FIGS. 4 and 5. At the time that transition 462 is detected, the user device 460 may still be interacting with original access network 450—for example, the user device 460 may be located in overlap area 500 between access networks 450 and 452. As the user transitions between access network 450 and 452, further steps may be taken to hand off responsibility for content from electronic device 470 to electronic device 472.

At step 606, a tunnel is created between the source local content server in the access network 450, represented by electronic device 470, and a destination content server in the second access network 452, represented by electronic device 472. Tunneling is described above with reference to connection 464 in FIG. 4.

At step 608, protocols running on the electronic device 470, or data supplied by electronic device 470, may be duplicated and sent over the tunnel. Alternatively, instead of duplicating the protocols or data, the protocols or data may be redirected through the tunnel. The data may include content provided to a user device 460. Further, the data may include streaming content. Streaming content includes a succession of data elements that are made available over time as a "stream" of data. Examples of streaming content include streaming video and streaming audio. If streaming content is served by electronic device 470 to user device 460, then the data stream may be duplicated at step 608, resulting in an original data stream served by electronic device 470 to user device 460 and a second, duplicate data stream. The duplicate data stream may be routed through the tunnel to electronic device 472 in second access network 452.

At step 610, the duplicate data provided over the tunnel to electronic device 472 may optionally be discarded. Because user device 460 may still be interacting with original access network 450, the duplicate data, for example the duplicate data stream, may not be needed immediately and can be safely discarded to free system resources.

Alternatively, as the user device 460 moves out of overlap area 500 and into the non-overlapping area of access network 452, the duplicate data may be provided by electronic device 472. The duplicate data may still be served from electronic device 470, but because of the presence of the tunnel, the duplicate data can move from electronic device 470 to electronic device 472 and can then be served from electronic device 472 to user device 460. In this way, data can be served from the access networks without involving the core network.

If one or more proxies are used in step 602, as described above, the proxies may be moved from the source local content server to the destination local content server, represented by electronic devices 470 and 472, respectively, at step 612. For example, if streaming video is provided using an RTP proxy and an RTSP proxy, new instances of the RTP and RTSP proxies may be instantiated on electronic device 472. Because the original RTP and RTSP proxies have context information like session IDs that may be used if the duplicate proxies provide duplicate content, the context information may be copied or moved to the new proxies.

At step 614, applications may be invoked on the destination local content server, represented by electronic device 472. In the above RTP/RTSP example, the RTP and RTSP applications may be invoked on electronic device 472. If the duplicated data is a data stream, the related application may be invoked at a proper place in the stream. At step 616, the duplicated data may be synchronized with the original data. For example, if the data consists of a data stream, such as streaming video, then the duplicate data stream may be synchronized with the original data stream. At this point, the data may be served from electronic device 472, rather than electronic device 470.

At step 618, the handover procedure may be completed. This may involve "clean up" tasks, such as removing the tunnel, if a tunnel was created at step 406. If the duplicated data consists of a data stream, then the stream may be stopped at the source local content server, represented by electronic device 470. Stopping the data stream may be accomplished, for example, by issuing an RTSP STOP command from the RTSP proxy on electronic device 470.

One having ordinary skill in the art will recognize that the steps depicted in the flow chart in FIG. 6 do not necessarily need to be performed in the order presented, nor is every step required. For example, if a user moves from access network 450 into overlap area 500 in step 604, and then moves out of overlap area 500 back into access network 450, it may not be necessary to take further steps to accomplish a handover of responsibility for content sourcing to access network 452. If, for example, a tunnel has been created to accommodate such a handover, the tunnel may be safely removed when the user moves out of overlap area 500 and back into the non-overlapping area of access network 450. If the content does not comprise streaming video or audio, it may not be necessary to synchronize the streams in step 616. If proxies are not used, then the proxy context may not need to be duplicated at step 612. Optionally, the duplicated data may be served directly to the user device 460, rather than being discarded at step 410. Additionally, some of steps 406 through 418 may be accomplished before the user moves to the second access network 452, for example in anticipation of, or preparation for, an eventual move.

Figure 7:
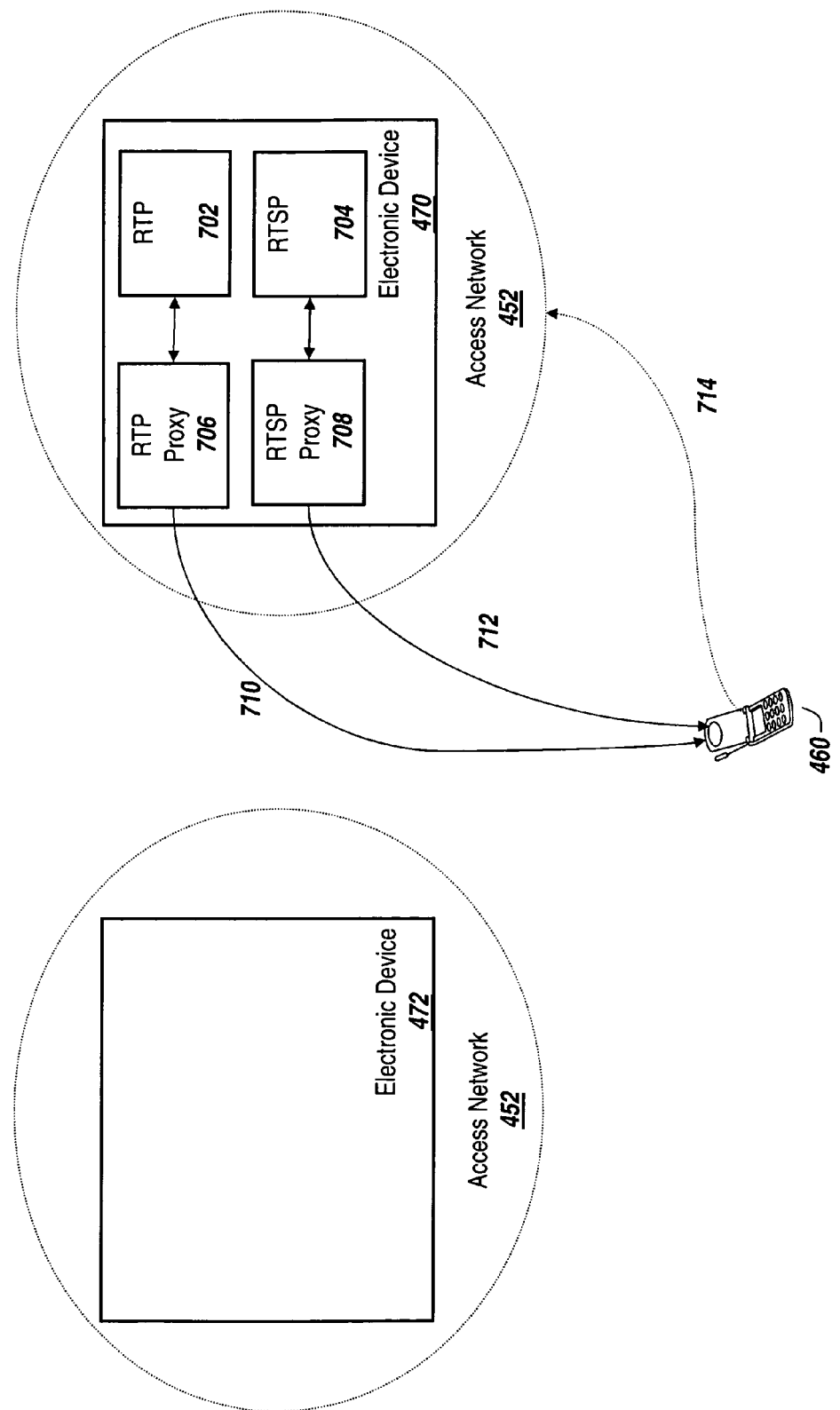
FIG. 7 depicts a user interacting with a local content server in a first access network.

FIG. 7 depicts a user device 460 interacting with a local content server, represented by electronic device 470 in a first access network 450. For ease of discussion, user device 460 is shown interacting directly with electronic device 470. However, one having ordinary skill in the art will understand that it may not be the case that user device 460 interacts directly with electronic device 470. As depicted above in FIG. 4, other intermediate devices may be located between user device 460 and electronic device 470 in the access network 450, such as base station 490 or intermediate services platform 482. User device 460 may interact with electronic device 470 through any or all of these intermediate devices, and electronic device 470 may interact with user device 460 through any or all of these intermediate devices.

Electronic device 470 serves content to the user device 460. In the illustrated example, electronic device 470 serves streaming content, such as a streaming video. To stream the content, electronic device 470 invokes an RTP application 702 and an RTSP application 704. The RTP application 702 provides the data associated with the streamed content. The RTSP application 704 provides for user control over the stream. For example, if the content is a video, RTP application 702 may provide the video while the RTSP application controls the playback of the video, offering options like pausing and resuming the video.

RTP application 702 communicates with an RTP proxy 706, which provides an interface between RTP application 602 and user device 460. User device 460 and RTP proxy 706 may communicate using a protocol 710, for example UDP. RTP proxy 706 may communicate with RTP application 702 using the same protocol 710, or a different protocol. RTSP application 704 communicates with an RTSP proxy 708, which provides an interface between RTSP application 704 and user device 460. RTSP proxy 708 may communicate with user device 460 using a protocol 712, for example TCP. RTSP proxy 708 may communicate with RTSP application 704 using the same protocol 712, or a different protocol.

As indicated by connection 714, at the time depicted in FIG. 7 user device 460 is communicating with access network 450. This might correspond, for example, to step 602, and might represent a time when user device 460 is in the non-overlapping area of access network 450 (although user device 460 might also have a connection 714 to access network 450 when user device 460 is present in the overlapping area 500 between access networks 450 and 452, or when user device 460 is located completely within an access network other than access network 450).

The applications and proxies 702, 704, 706, and 708 may be provided, for example, in the storage 310 of electronic device 470.

Figure 8:
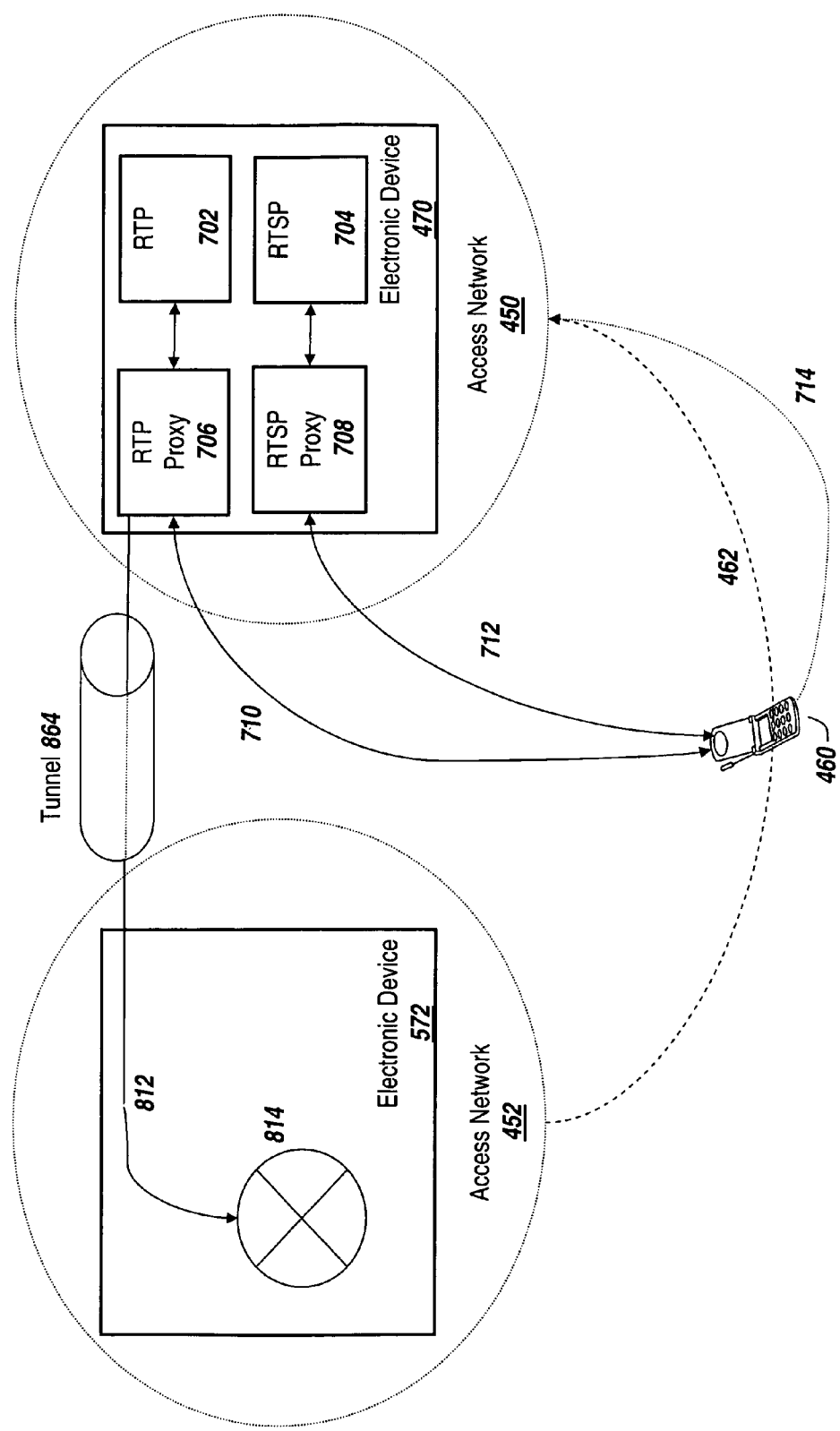
FIG. 8 depicts an IP tunnel between a source local content server in a first access network and a destination local content server in a second access network.

In FIG. 8, a transition 462 of the user device 460 between access networks 450 and 452 is detected or identified. This may indicate that the user is moving to access network 452, indicated in step 604 in FIG. 6. Methods for detecting such a transition 462 are described above in relation to FIGS. 4 and 5. An IP tunnel 864 is created (e.g., step 606 in FIG. 6) between a source local content server represented by electronic device 470 in a first access network 450 and a destination local content server represented by electronic device 472 in a second access network 452.

Data and protocols may be duplicated over tunnel 864 (e.g., step 608 in FIG. 6). For example, the data stream associated with the streaming content provided through RTP proxy 706 may be duplicated to create a duplicate data stream 812 and sent through tunnel 864 to electronic device 472.

At this point in time, user device 460 continues to maintain a connection 714 to original access network 750. The original data stream continues to be provided to user device 460 by electronic device 470 using RTP proxy 706 via protocol 710. Because the duplicate data stream 812 is not served to the user device 460, the duplicate data may be discarded 814 on electronic device 452 (e.g., step 610 in FIG. 6).

Figure 9:
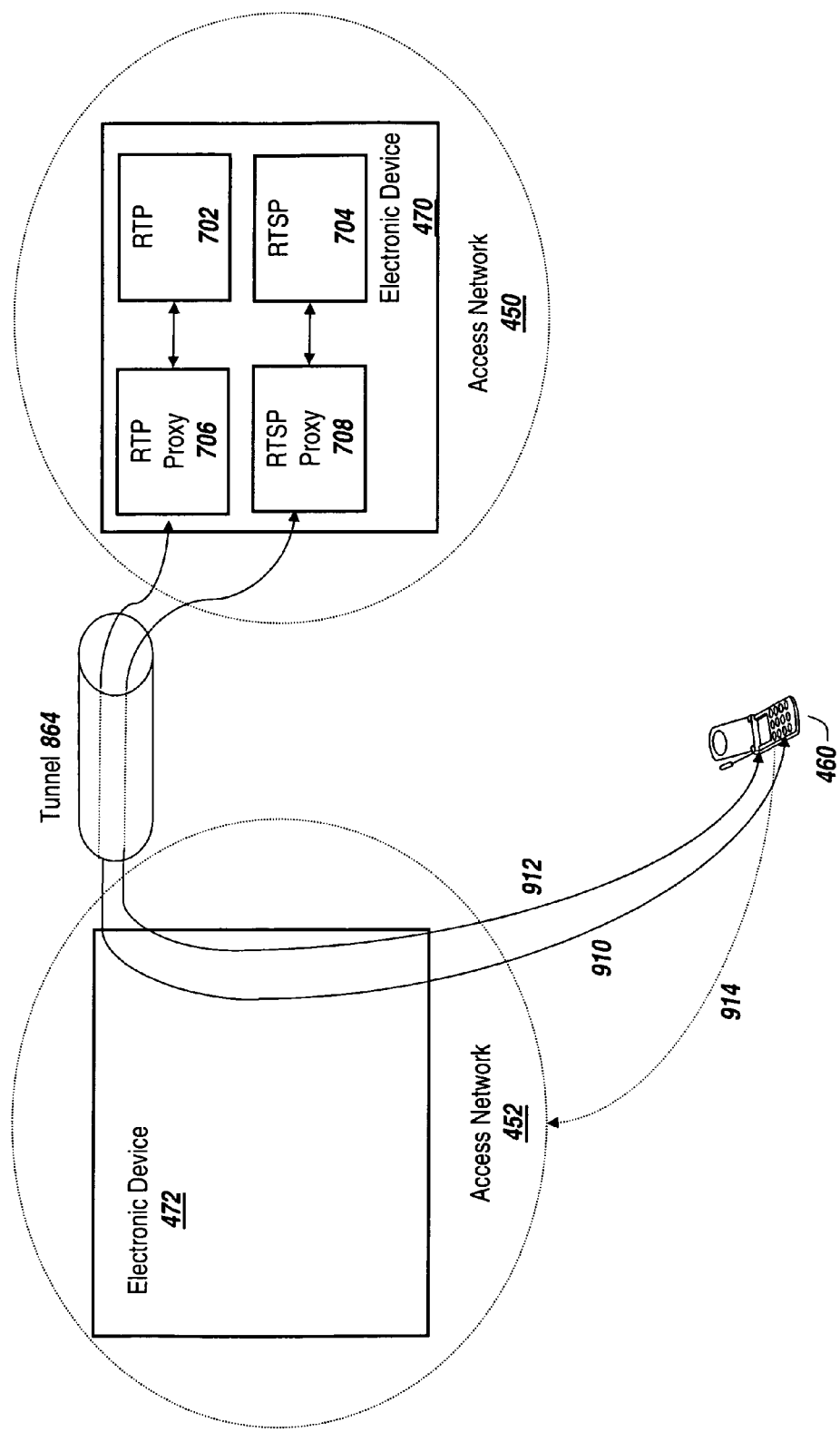
FIG. 9 depicts an application session running a destination local content server in the second access network, duplicating an application session running on a source local content server in the first access network.

In FIG. 9, the user device has transitioned into the second access network 452 and now maintains a connection 914 to second access network 452, but not to the original access network 450. In this situation, the applications and proxies 702, 704, 706, and 708 operate on electronic device 470, but no corresponding applications or proxies yet exist on electronic device 472. The duplicated data stream is now served to user device 460 by electronic device 472 over protocol 910, which passes from RTP proxy 706 on electronic device 470 through tunnel 864. Similarly, the control protocol 912 is provided to user device 460 by electronic device 472, and the control protocol 912 passes from RTSP proxy 708 on electronic device 472 through tunnel 864.

Figure 10:
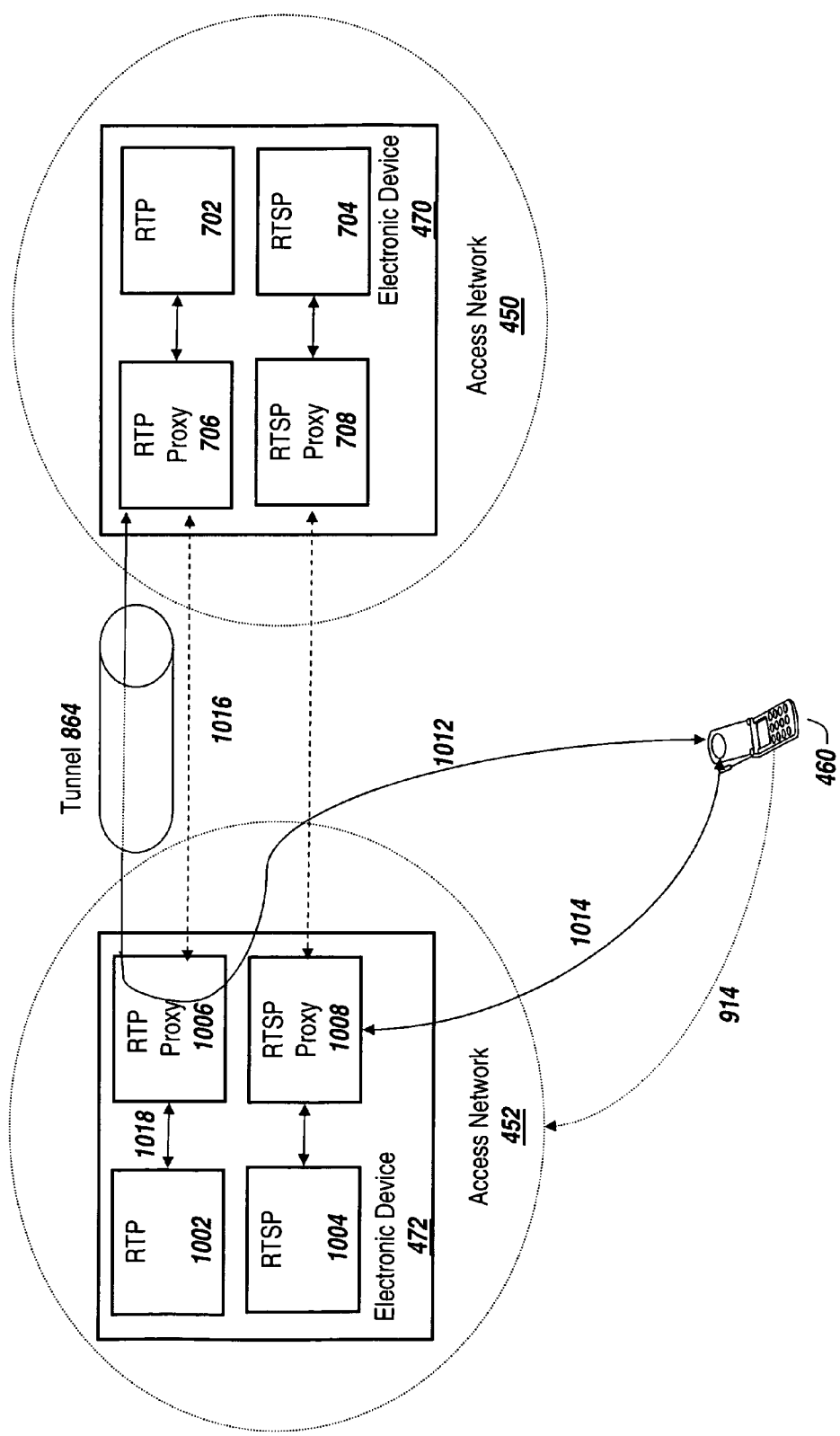
FIG. 10 depicts the synchronization of application sessions running on source and destination local content servers.

FIG. 10 depicts an application session running a destination local content server represented by electronic device 472 in second access network 452, duplicating an application session running on a source local content server represented by electronic device 470 in first access network 450. For example, in FIG. 10, a new RTP application 1002 and a new RTSP application 1004 are instantiated on electronic device 472, duplicating the applications 702 and 704, respectively, on electronic device 470. In addition, new proxies 1006 and 1008 are instantiated on electronic device 472, duplicating the proxies 706 and 708 provided on electronic device 470.

As the new proxies 1006 and 1008 are instantiated, the proxy contexts 1016 may be duplicated or moved from the original proxies 706 and 708 to the new proxies 1006 and 1008 (e.g., step 612 in FIG. 6).

At this point in time, the data stream is still provided on electronic device 470 through tunnel 864 to electronic device 460. As RTP proxy 1006 is instantiated on electronic device 472, the data stream 1012 may be routed through the RTP proxy 1006. When RTSP proxy 1008 is instantiated on electronic device 472, RTSP control may pass to electronic device 472, and the user device 460 may now send RTSP commands to control the data stream directly to RTSP proxy 1008 on electronic device 472 through protocol 1014.

FIG. 10 also depicts the synchronization 1018 of application sessions running on source and destination local content servers, represented by electronic devices 470 and 472, respectively. Synchronization 1018 is discussed above in relation to step 616 in FIG. 6.

Figure 11:
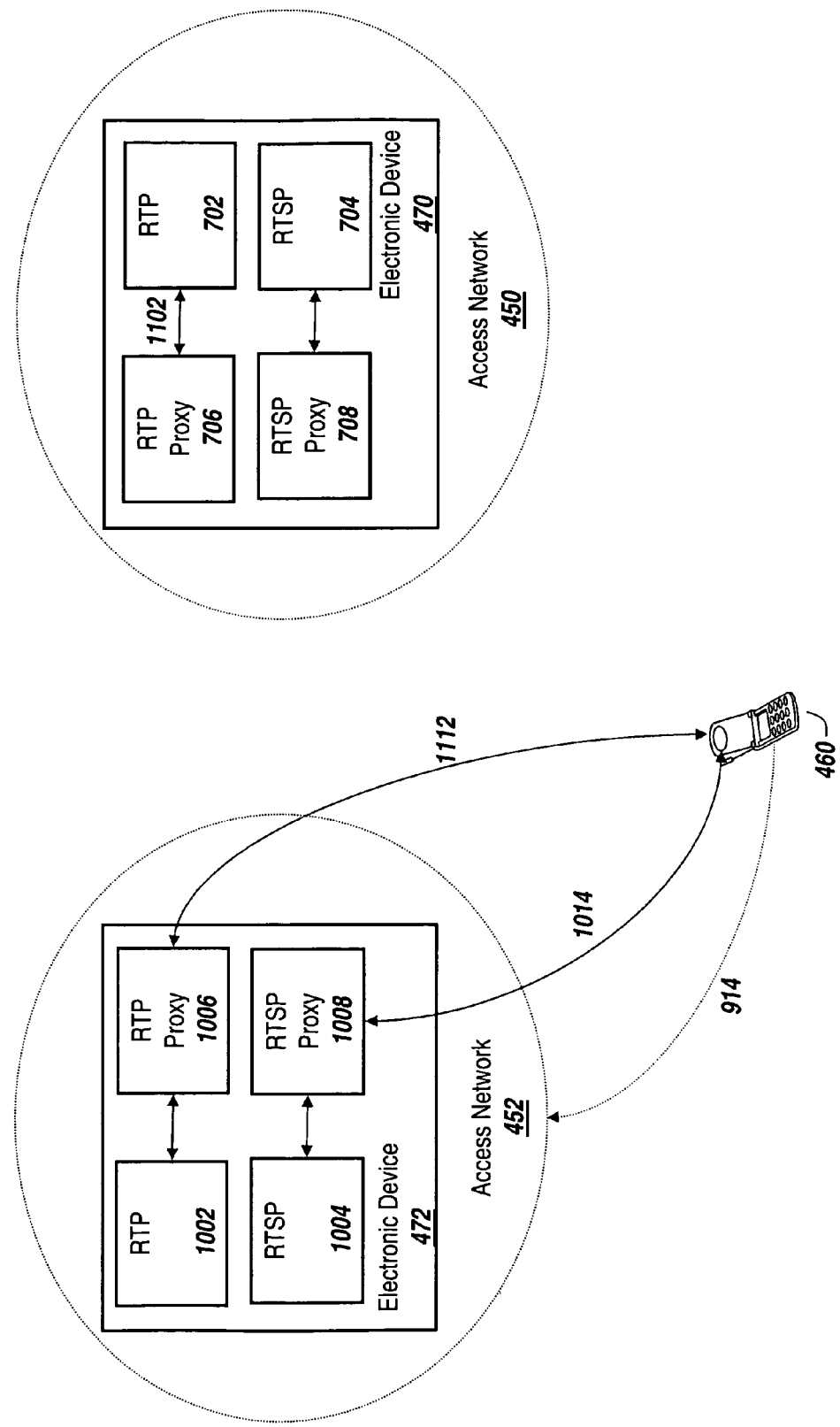
FIG. 11 depicts a completed handover of application sessions from a source local content server to a destination local content server.

FIG. 11 depicts a completed handover of application sessions from a source local content server represented by electronic device 470 to a destination local content server represented by electronic device 472. With the streams synchronized, responsibility for serving the stream moves to RTP application 1002 and RTP proxy 1006, which provide the stream from electronic device 472 to user device 460 via protocol 1112. The tunnel 864 (not shown) is removed, and content sourcing on electronic device 470 is stopped, for example by issuing an RTPS STOP command 1102. The application or data is now provided on electronic device 472. The user device 460 may or may not be made aware that the application or data has moved.

Although the above description has been given with specific examples from a mobile network, one having ordinary skill in the art will recognize that the present invention is not so limited, and may be applied in any type of network. Moreover, specific examples have been given of streaming audio and video provided in conjunction with RTP/RTSP. However, one having ordinary skill in the art will understand that the present invention can be applied to other content types and protocols, such as (but not limited to) web data provided via HTTP and file transfer accomplished with FTP.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the appended claims and the applicable rules of law.

The invention claimed is:

1. A method in an electronic device for providing content to a user device in a communication network having an access network and a core network, the method comprising:
   serving a first data stream of content from a source content server in the access network to the user device, the content being accessed using a protocol;
   identifying that the user device is transitioning from a connection to the source content server to a connection to a destination content server; and
   handing over responsibility for serving the content from the source content server to the destination content server, wherein handing over responsibility for serving the content comprises:
      creating a tunnel between the source content server and the destination content server,
      creating a second data stream over the tunnel, the second data stream being a duplicate of the first data stream,
      interacting with a proxy at the destination content server, the proxy corresponding to the protocol used to access the content at the source content server, the proxy having a context, and
      moving the context from the protocol at the source content server to the proxy at the destination content server.

2. The method of claim 1, wherein the source local content server is located in a first access network of the communication network, and the destination content server is located in a second access network of the communication network.

3. The method of claim 1, wherein the content comprises streaming content associated with the first data stream on the source content server.

4. The method of claim 1, wherein the tunnel is an IP tunnel.

5. The method of claim 1, further comprising synchronizing the duplicate second data stream with the first data stream on the source local content server.

6. The method of claim 1, wherein the proxy is one of the group of a Real Time Streaming Protocol proxy and a Real Time Transport Protocol proxy.

7. The method of claim 1, further comprising invoking an application related to the content on the destination local content server.

8. The method of claim 1, further comprising:
   receiving data related to the content on the destination content server prior to handing over responsibility for serving the content to the destination content server; and
   discarding the data.

9. A non-transitory electronic device readable storage medium storing executable instructions for providing content to a user device in a communication network, the communication network comprising an access network and a core network, the instructions causing a processor to:
   serve a first data stream of content from a source content server in the access network to the user device, the content being accessed using a protocol;

identify that the user device is transitioning from a connection to the source content server to a connection to a destination content server; and provide information for handing over responsibility for serving the content from the source content server to the destination content server, wherein the handing over of responsibility for serving the content comprises:
create a tunnel between the source content server and the destination content server,
create a second data stream over the tunnel, the second data stream being a duplicate of the first data stream,
interact with a proxy at the destination content server, the proxy corresponding to the protocol used to access the content at the source content server, the proxy having a context, and
move the context from the protocol at the source content server to the proxy at the destination content server.

10. An electronic device for providing content to a user device in a communication network, the communication network comprising an access network and a core network, the electronic device comprising:
a storage for storing content; and
a processor for executing instructions, the instructions causing the processor to:
serve a first data stream of content from a source content server in the access network to the user device, the content being accessed using a protocol;
identify that the user device is transitioning from a connection to the source content server to a connection to a destination content server; and
hand over responsibility for serving the content from the source content server to the destination content server, wherein the handing over of responsibility for serving the content comprises:
create a tunnel between the source content server and the destination content server,
create a second data stream over the tunnel, the second data stream being a duplicate of the first data stream,
interact with a proxy at the destination content server, the proxy corresponding to the protocol used to access the content at the source content server, the proxy having a context, and
move the context from the protocol at the source content server to the proxy at the destination content server.

11. The electronic device of claim 10, wherein the content comprises streaming content associated with the first data stream on the source content server, and the instructions further comprise instructions causing the processor to:
synchronize the duplicate data stream with the data stream on the source local content server.

* * * * *